(12) United States Patent
Weimer

(10) Patent No.: US 10,226,828 B2
(45) Date of Patent: Mar. 12, 2019

(54) SYSTEM AND METHOD FOR CONTROLLING A FEED-SPEED TO A BANDMILL

(71) Applicant: Jeffrey David Weimer, Priest River, ID (US)

(72) Inventor: Jeffrey David Weimer, Priest River, ID (US)

(73) Assignee: J.D. LUMBER, INC., Priest River, ID (US)

( * ) Notice: Subject to any disclaimer, the term of this patent is extended or adjusted under 35 U.S.C. 154(b) by 0 days.

(21) Appl. No.: 15/138,090

(22) Filed: Apr. 25, 2016

(65) Prior Publication Data

US 2016/0236291 A1    Aug. 18, 2016

(51) Int. Cl.
  *B23D 59/00*  (2006.01)
  *B23D 55/08*  (2006.01)

(52) U.S. Cl.
  CPC ......... *B23D 59/001* (2013.01); *B23D 55/088* (2013.01); *B23D 59/008* (2013.01)

(58) Field of Classification Search
  CPC ... Y10T 83/141; Y10T 83/159; Y10T 83/474; Y10T 83/4743; Y10T 83/6596; Y10T 83/707; Y10T 83/7076; Y10T 83/7226; Y10T 83/7239; B23D 59/001; B23D 59/002; B23D 59/008; B23D 55/088; B23D 55/04; B23D 55/043; B23D 55/10
  See application file for complete search history.

(56) References Cited

U.S. PATENT DOCUMENTS

| | | | | |
|---|---|---|---|---|
| 2,754,567 A | * | 7/1956 | Crane | B23D 55/046 192/150 |
| 4,329,901 A | | 5/1982 | Stroud | |
| 4,557,168 A | | 12/1985 | Tokiwa | |
| 4,644,832 A | * | 2/1987 | Smith | B23D 47/005 700/160 |
| 4,926,917 A | * | 5/1990 | Kirbach | B23D 55/046 144/356 |
| 5,070,751 A | * | 12/1991 | Harris | B23D 55/084 83/62.1 |
| 5,237,897 A | | 8/1993 | Wijesinghe et al. | |
| 5,694,821 A | * | 12/1997 | Smith | B23D 59/002 700/188 |
| 2002/0020266 A1 | | 2/2002 | Smith | |
| 2006/0037448 A1 | * | 2/2006 | Snodgrass, Jr. | B23D 55/10 83/13 |

(Continued)

OTHER PUBLICATIONS

1/6-FAMPAT-Questel (Questel-Orbit FamPat database), 2 pgs, Feb. 21, 2016.

(Continued)

*Primary Examiner* — Phong H Nguyen
(74) *Attorney, Agent, or Firm* — Birdwell & Janke, LLP

(57) ABSTRACT

A method and system for controlling a feed-speed to a bandsaw having a sawblade trained around a drive wheel and a spaced-apart driven wheel, and a strain adjustment mechanism for adjusting the strain on the sawblade by changing the spacing therebetween. The method includes sensing a change in the spacing and making a corresponding change in the feed-speed. The system controls an input device for feeding a workpiece to the bandsaw, and includes a sensor and a controller for performing the aforementioned functions.

24 Claims, 4 Drawing Sheets

(56) References Cited

U.S. PATENT DOCUMENTS

| | | | |
|---|---|---|---|
| 2006/0053990 A1* | 3/2006 | Barker | B23D 55/046 83/74 |
| 2015/0020660 A1 | 1/2015 | Jeng et al. | |
| 2015/0027288 A1* | 1/2015 | Jeng | B23D 55/10 83/819 |
| 2015/0158097 A1* | 6/2015 | Myrfield | B23D 59/002 83/13 |
| 2015/0183037 A1 | 7/2015 | Jeng et al. | |

OTHER PUBLICATIONS

2/6-FAMPAT-Questel (Questel-Orbit FamPat database), 1 pg, Feb. 21, 2016.
3/6-FAMPAT-Questel (Questel-Orbit FamPat database), 2 pgs, Feb. 21, 2016.
4/6-FAMPAT-Questel (Questel-Orbit FamPat database), 2 pgs, Feb. 21, 2016.
5/6-FAMPAT-Questel (Questel-Orbit FamPat database), 1 pg, Feb. 21, 2016.
6/6-FAMPAT-Questel (Questel-Orbit FamPat database), 2 pgs, Feb. 21, 2016.
ISA/US; International Search Report, Written Opinion, and Search History in International Application No. PCT/US17/29288, Sep. 15, 2017.
International Bureau, International Preliminary Report on Patentability, in PCT/US2017/029288; dated Oct. 30, 2018.

* cited by examiner

Fig. 1
*(PRIOR ART)*
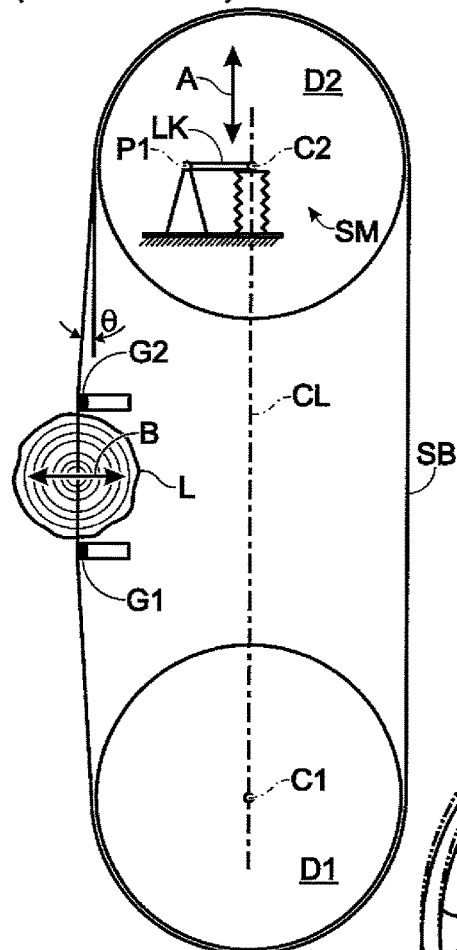
Fig. 2
*(PRIOR ART)*
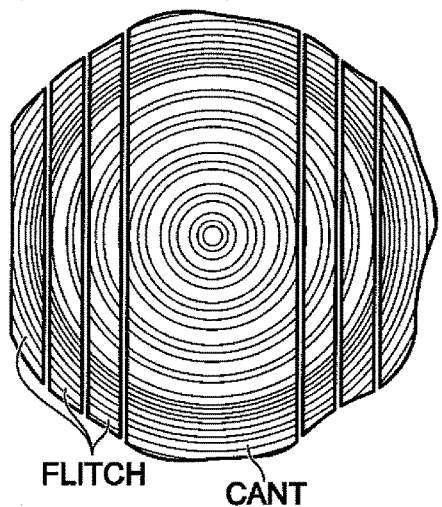
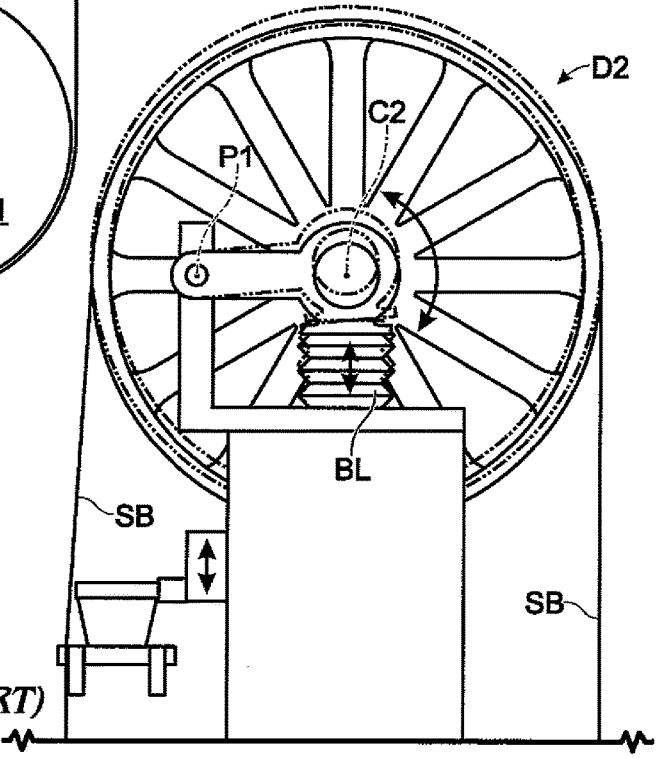
Fig. 3
*(PRIOR ART)*

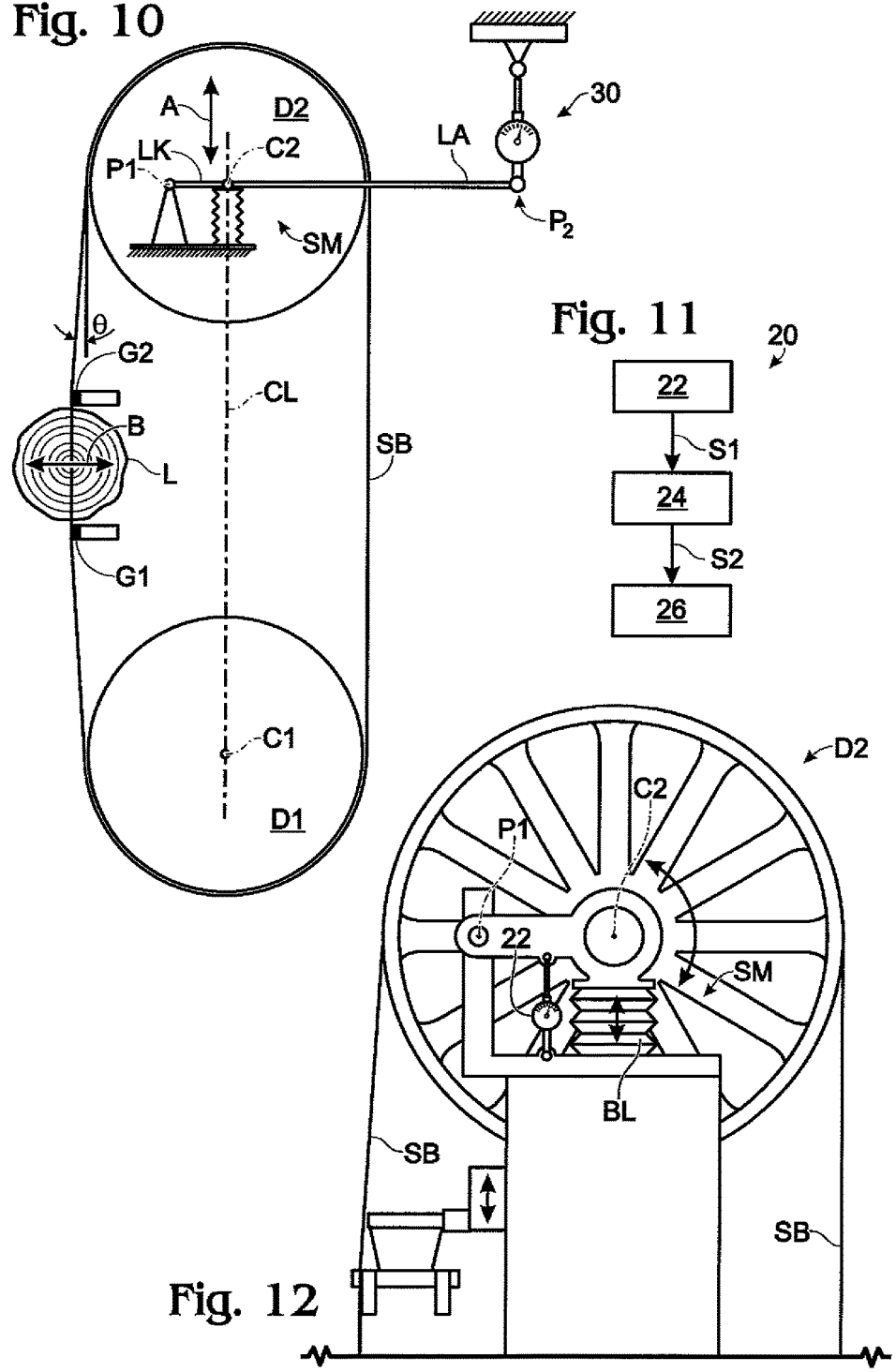

SYSTEM AND METHOD FOR CONTROLLING A FEED-SPEED TO A BANDMILL

FIELD OF INVENTION

The present invention relates to controlling the feed-speed of a workpiece to be cut by a bandsaw, and more particularly, a bandsaw of the type used in sawmills for cutting logs where it is often referred to as a bandmill.

BACKGROUND

A bandsaw is a cutting apparatus that turns or trains an endless loop of a cutting element having a serrated or toothed edge (hereinafter sawblade) around two spaced-apart wheels. It is often used for cutting wood.

More particularly with reference to FIG. 1, a typical bandsaw 10 has a drive wheel D1 which drives a driven wheel D2 by turning a sawblade SB which loops around the two wheels. The sawblade is typically formed of steel. Bandsaws are provided in sizes that are small enough to allow for use on a table-top, and range up to the very large sizes used in sawmills for cutting logs, where the distance between the rotational centers C1 and C2 of the wheels is typically 10 feet or more.

The sawblade slides across a pair of "guides" G1 and G2 that push it outwardly, away from centerline CL of the wheel centers. This causes the sawblade to make a slight positive angle θ relative to the centerline CL as it leaves the driven wheel D2 and approaches the upper guide G2 (or alternatively, depending on the direction of rotation of the wheels, as it approaches the driven wheel after having left the upper guide), and as it approaches the driving wheel D1 after having left the lower guide G1 (or alternatively, depending on the direction of rotation of the wheels, as it leaves the driving wheel and approaches the lower guide).

A log "L" to be cut lengthwise with the sawblade SB is fed between the guides G1 and G2, in a direction perpendicular to the plane of the Figure, typically for producing "cants" and "flitches" as indicated in FIG. 2.

It is desired to maintain a substantially constant (tensile) stress on the sawblade, which decreases when the sawblade lengthens. To compensate for this lengthening, or "strain," the sawblade, the position of the driven wheel D2 is adjusted along the axis indicated as "A" by a strain adjustment mechanism indicated generally as "SM."

FIG. 3 shows an example of such a mechanism employing a typical elastomeric bellows "BL." It may be noted that, due to the fulcrum and lever arrangement shown for mounting the driven wheel D2, the axis "A" is actually a circular arc, but for small rotations of the wheel center C2 about the pivot point P1 this are is reasonably approximated by a straight line.

The bellows is served by a pressurized line (air or hydraulic fluid) which pressurizes it to a degree determined by a human operator who initially sets the pressure in the line. The position of the driven wheel is a consequence of a balance between the expansion force of the bellows and the resistance of the sawblade, which provides for a position adjustment whereby the driven wheel moving farther apart from the drive wheel as the sawblade becomes increasingly strained. The expansion force provided by the bellows remains constant, independent of the strain, so long as the pressure setting remains unchanged, resulting in a constant stress on the sawblade at all times.

U.S. Patent Publication No. 2015/0158097 describes a problem known in the art as instability (referred to as "an oscillation . . . called 'snaking' . . . ") of the sawblade, and proposes as a solution to sense changes in the forces detected by force sensors at the guides, particularly the guide that is downstream of the log, in terms of the direction of movement of the sawblade, i.e., the guide G1 if the sawblade circulates counterclockwise, or the guide G2 if the sawblade circulates clockwise, in FIG. 1. These changes are described as being precedent to instability of the sawblade, and are used to control the speed of feeding the workpiece to the bandsaw, hereinafter "feed-speed."

SUMMARY

A system and method for controlling a feed-speed to a bandsaw is disclosed herein. The bandsaw has a sawblade trained around a drive wheel and a spaced-apart driven wheel, and a strain adjustment mechanism for adjusting the strain on the sawblade by changing the spacing therebetween.

The method includes sensing a change in the spacing and making a corresponding change in the feed-speed.

The system controls an input device for feeding a workpiece to the bandsaw, and includes a sensor and a controller for performing the aforementioned functions.

It is to be understood that this summary is provided as a means of generally determining what follows in the drawings and detailed description and is not intended to limit the scope of the invention. Objects, features and advantages of the invention will be readily understood upon consideration of the following detailed description taken in conjunction with the accompanying drawings.

BRIEF DESCRIPTION OF DRAWINGS

FIG. 1 is a schematic representation of a bandsaw.

FIG. 2 is an end-view of a log showing cuts defining "cants" and "flitches."

FIG. 3 is an isometric view of a prior art bandsaw using an elastomeric bellows to provide for sawblade strain adjustment.

FIG. 10 is the schematic representation of FIG. 1, modified for measuring strain according to the present invention.

FIG. 11 is a block diagram of a feed-speed control system according to the present invention.

FIG. 12 is the isometric view of FIG. 3, modified for measuring strain according to the present invention.

DESCRIPTION OF PREFERRED EMBODIMENTS

It is an objective of the present invention to improve on the prior art methodology described above for controlling feed-speed to a bandsaw in a sawmill. The strain adjustment mechanism responds to elastic (reversible) increases in the length of the sawblade that result from the ever increasing amounts of heat generated as the sawblade wears, and plastic (permanent) increases in the length of the sawblade that occur as a result of the sawblade encountering inhomogeneities in the workpiece, in an effort to maintain constant stress on the sawblade.

The present inventor has recognized that maintaining a constant stress on a sawblade that is stretching either because it is getting hotter due to wear or because it is plastically deforming as a result of normal use increases the risk of premature and catastrophic failure of the sawblade if the same feed-speed is also being maintained.

It is also recognized that, when the sawblade experiences a shock, such as when encountering a knot in a log, the sawblade transmits a (transient) oscillatory force to the driven wheel, which (likewise transiently) oscillates in response due to the fact that the elastomeric bellows, which serves as a load-bearing joint between the driven wheel and the frame of the bandsaw, has compliance. This produces oscillatory changes in the strain of the sawblade independent of any strain adjustment.

All of these effects can be discerned by measuring the strain on the sawblade. By contrast, the only one of these effects that can be discerned by measuring the forces at the guides is shock, and only if the shock is of a sufficient magnitude—the cumulative effects of the multitude of minor shocks that occur over the life of a sawblade will be missed.

The present invention provides for measuring the strain on the sawblade, and controlling the feed-speed in response, typically by reducing it as the strain increases.

Figure 4:
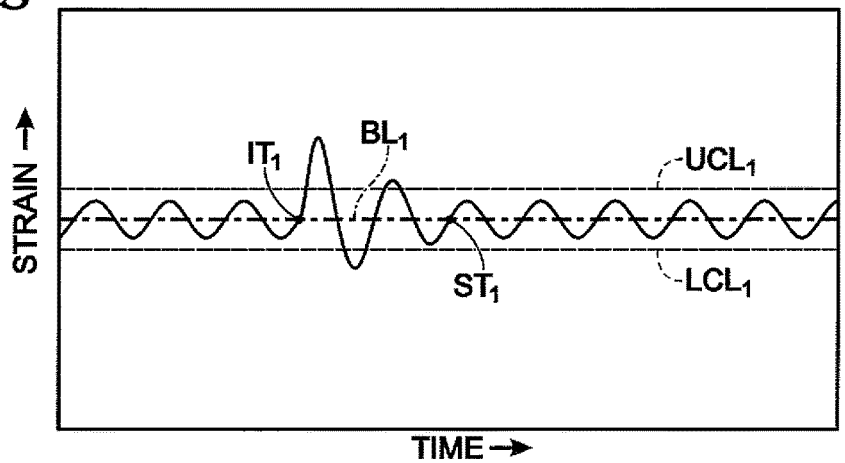
FIG. 4 is a plot of strain versus time for a hypothetical sawblade, showing the effect of a relatively small impact force.
Figure 5:
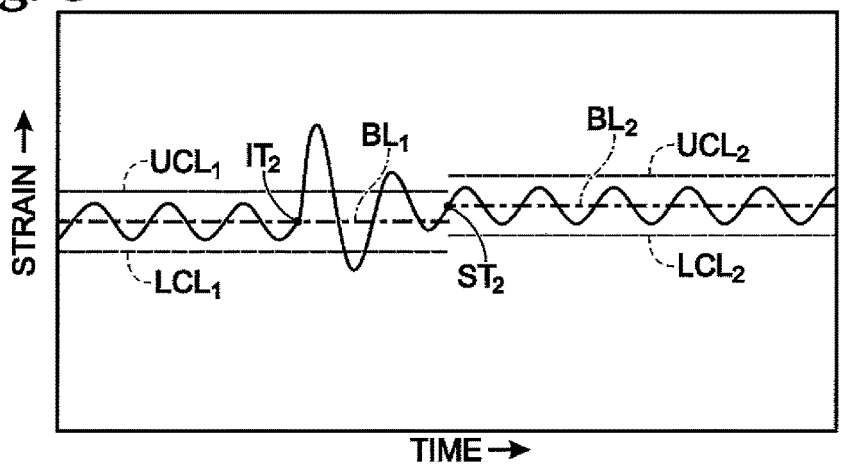
FIG. 5 is a plot of strain versus time for a hypothetical sawblade, showing the effect of a relative large impact force.

FIGS. 4 and 5 show, respectively, examples of elastic and plastic changes in strain, in plots of strain versus time. In both Figures, strain is shown oscillating sinusoidally for illustrative purposes, but in reality the oscillations would typically be more randomized (i.e., they would have additional Fourier components).

In FIG. 4, the strain oscillates around a baseline $BL_1$. Upper and lower "control limits" $UCL_1$ and $LCL_1$ may be superimposed on the plot, representing desired limits on the changes in strain so that the strain does not vary more than a desired number of standard deviations from the baseline, e.g., 3 or 5.

Prior to an initial time "$IT_1$" the strain on a sawblade cutting a log varies elastically and regularly about a baseline $BL_1$. At an initial time $IT_1$, the sawblade is shocked by a sudden but relatively low magnitude impact force, such as by encountering a small knot in the log. As a result of the impact, the strain deviates unusually from the baseline until it settles down after a "settling" time "$ST_1$" to resume its ordinary magnitude of oscillation around the baseline. In this example the impact force is not large enough to plastically deform the sawblade, so the strain settles around the original baseline $BL_1$.

By contrast, in FIG. 5, the impact force is larger and causes a more severe oscillation, resulting in a permanent strain of the sawblade that results in the strain settling, after the settling time "$ST_2$," to a new baseline $BL_2$. The new baseline may be provided with new control limits "$UCL_2$" and "$LCL_2$," which may or may not represent the same magnitude of deviation around the baseline as the previous control limits.

The control limits in both cases can be used to recognize the occurrence of an event that bears watching and/or calls for a change in the feed-speed, and to identify times when the strain has settled around a baseline, as evidenced by the strain remaining within the control limits for an extended period of time.

Figure 6:
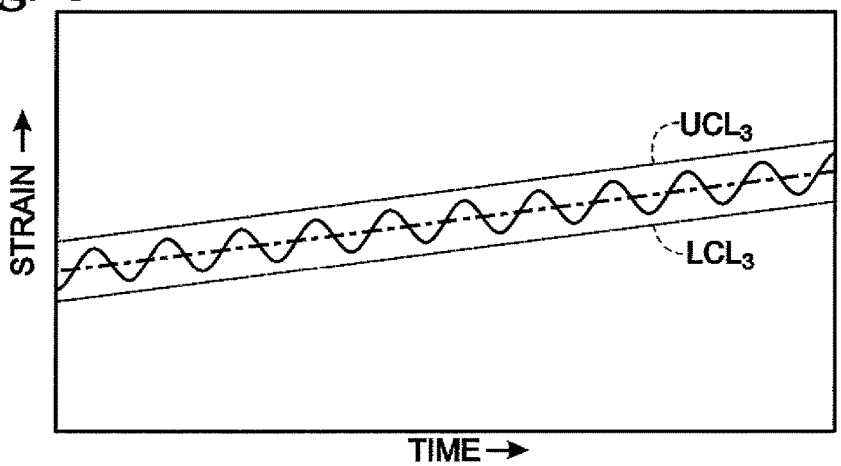
FIG. 6 is a plot of strain versus time for a hypothetical sawblade, showing the effect of a gradually and steadily increasing strain.

FIG. 6 shows a strain for which the baseline is a trend line, representative of the sawblade undergoing gradual and steadily increasing strain, which can be either or both because the sawblade is steadily heating up as it wears, and is therefore undergoing steady thermal expansion (which is elastic, or reversible strain), and because the sawblade is gradually accumulating plastic deformations in response to encountering relative minor inhomogeneities in the workpiece (which is irreversible strain). The control limits, here upper control limit $UCL_3$ and lower control limit $LCL_3$, follow the same trend, and in the example shown, there is never an event which causes the strain to fall outside the control limits.

Figure 7:
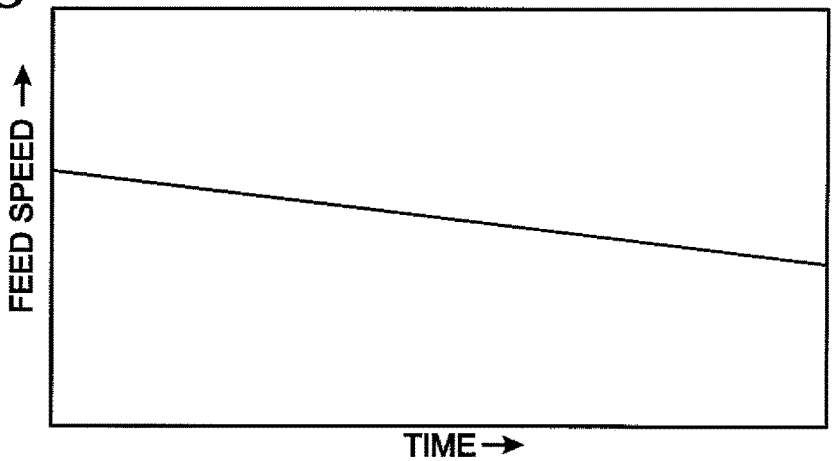
FIG. 7 is a plot of feed-speed versus time for the circumstance shown in FIG. 6 according to the present invention.

FIG. 7 shows how the feed-speed may be adjusted in response to the strain shown in FIG. 6. In particular, in this example the feed-speed is reduced in direct proportion to the increase in strain. It should be understood that the proportionality shown is arbitrary, which can be appreciated by recognizing that no units are being provided on the vertical axes in either Figure. The only point here is that the feed-speed is being linearly reduced as a result of the strain being linearly increased.

Figure 8:
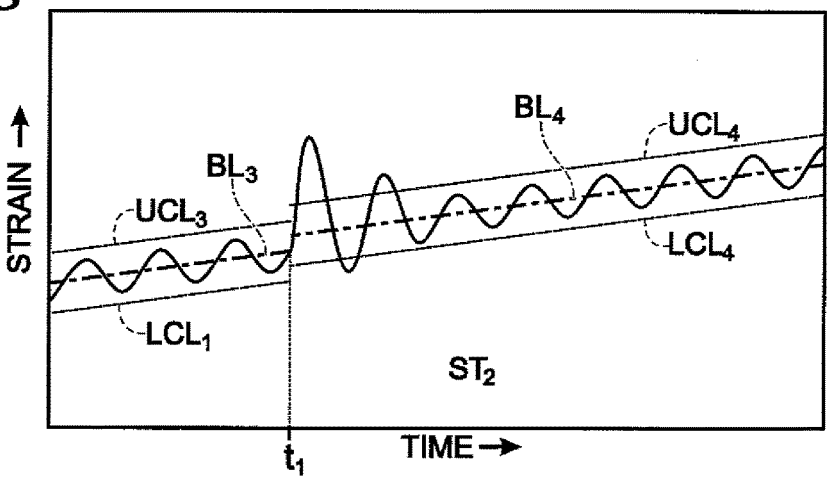
FIG. 8 is a plot of strain versus time for the sawblade of FIG. 6, showing the effect of a sudden shock in addition to the effect of gradually and steadily increasing strain.

FIG. 8 shows an example like FIG. 6, except that there is an event, occurring at time "$t_1$," that suddenly shocks the sawblade and causes the strain to fall outside the control limits that have been set for the initial baseline "$BL_3$." Where the sawblade is sawing a log, such an event could be, for example, where the sawblade encounters a knot on the log. In response to the event, the sawblade undergoes a sudden increase in strain due to plastic (irreversible) deformation.

After the event, the strain settles around a new (increased) baseline "$BL_4$" with essentially the same standard deviation as before, so that it is appropriate to recognize new control limits, from $UCL_3$ and $LCL_3$ to "$UCL_4$" to "$LCL_4$" respectively, that compensate for the increase in baseline.

Figure 9:
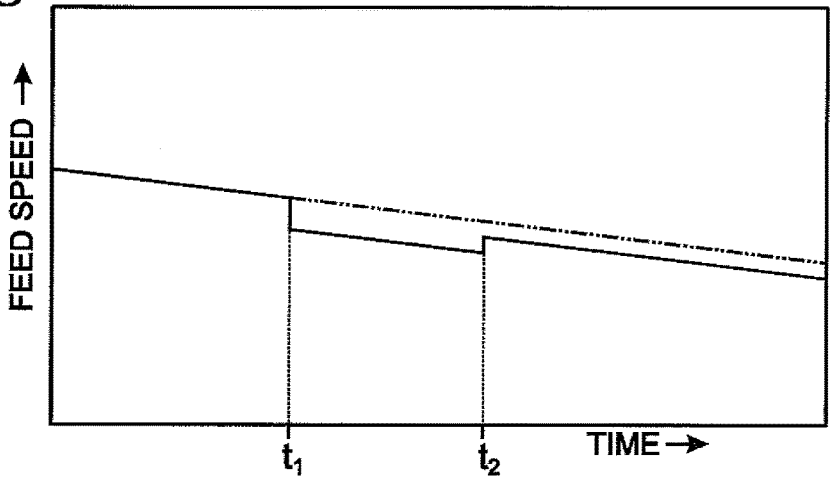
FIG. 9 is a plot of feed-speed versus time for the circumstance shown in FIG. 8 according to the present invention.

FIG. 9 shows how the feed-speed may be adjusted in response to the strain shown in FIG. 8. In this example the feed-speed is generally reduced in direct proportion to the increase in strain, except that it is in addition suddenly decreased by an additional amount after the event at time $t_1$. This may be an amount considered to provide a predetermined safety margin after which the feed-speed may be increased again, such as shown at "$t_2$," after the sawblade has settled from the shock of the event. The amounts of the initial additional decrease in feed-speed in response to the event, and any subsequent increase, may be determined by experience in view of the factors indicated further below.

FIG. 10 shows the prior art bandsaw of FIG. 1 modified for measuring strain according to the invention. The structure indicated as "30" illustratively represents a dial indicator, for measuring a displacement of the driven wheel caused by a strain adjustment, the displacement being representative of the strain on the sawblade.

FIG. 11 shows a feed-speed control system 20 for controlling a feed-speed to a bandsaw according to the present invention. The system 20 has a sensor 22 which is an electronic version of the aforementioned dial indicator for sensing displacement. An example is the MTS Temposonics® E series position sensor, available from the MTS Systems Corporation of Cary N.C.

The sensor 22 outputs an electrical signal "S1" representative of an amount of displacement of a structural member associated with the strain adjustment mechanism. FIG. 10 shows an exemplary mounting arrangement that provides for this.

The signal S1 is input to a controller 24, which is typically but not necessarily a digital computer, which is configured or programmed to track changes in the magnitude of the strain signal, and in response to these changes, produce a time-varying output speed-control signal "S2" which controls the speed of an input device 26, typically a carriage, conveyor, or rollcase, for feeding the workpiece to the bandsaw.

Examples of the control logic performed by the controller 24 have been discussed in connection with FIGS. 6-9, and may be as simple as to reduce the feed-speed in direct proportion to measured changes in strain, which can be either increases or decreases, or to measured or otherwise known increases in baseline, with the change in feed-speed being inversely related to the changes in strain, e.g., if the strain increases, the feed-speed is reduced.

There are, however, a number of complicating factors or variables that may be and preferably are taken into account when determining whether and/or how much to adjust the feed-speed. A partial list of such variables for consideration particularly in a sawmill, and how that factor generally affects the decision about how much to reduce the feed-speed when it is being reduced according to the principles of the invention, are:
1) density of the wood (greater density calls for more reduction in feed-speed)
2) whether the wood is frozen or not (frozen wood calls for more reduction in feed-speed)
3) whether there is a "frost tooth" on the sawblade (frost tooth calls for more reduction in feed-speed)
4) experience with or knowledge about the particular bandsaw being used (feed-speed reduction can be more or less, depending)
5) lumber quality (higher quality calls for more reduction in feed-speed)
6) gullet capacities of the saw teeth (small gullet capacity calls for more reduction in feed-speed)
7) depth of cut (large depth of cut calls for more reduction in feed-speed)
8) efficacy of the cooling system used in the bandsaw (better cooling allows for less reduction in feed-speed)
9) gauge (thickness) of the sawblade (thicker allows for less reduction in feed-speed)
10) stress on the sawblade (more stress allows for less reduction in feed-speed)
11) speed (sfpm) of the sawblade (higher sawblade speed allows for less reduction in feed-speed)
12) hardness (e.g., Rockwell) of the sawblade (higher hardness allows for less reduction in feed-speed)
13) maintenance status of the feed system (less maintenance calls for more reduction in feed-speed)
14) spacing between the guides (closer allows for less reduction in feed-speed)
15) whether one of the guides is moveable (if moveable, allows for less reduction in feed-speed)

Adjustments to feed-speed may be made when there is a change in strain or at a subsequent time, and they may be made continuously, periodically, or aperiodically as desired.

The strain adjustment mechanism SM may be modified to provide for mechanical amplification of the strain to increase the sensitivity of the strain measurement. This is indicated in the example of FIG. 10, where a lever arm "LA" has been attached to a link "LK" that connects the wheel center C2 of the driven wheel D2 to the wheel pivot point "P1," to effectively extend its length, so that a given angle of rotation of the link will produce an amplified movement along the axis A. The same modification can be made to the bandsaw of FIG. 3, such as shown in FIG. 12.

The strain on the sawblade of a bandsaw is rigorously determined by the spacing between the drive and driven wheels; accordingly, any means for measuring or inferring this spacing can be used for making strain measurements according to the present invention.

It is to be understood that, while a specific system and method for controlling a feed-speed to a bandsaw has been shown and described as being preferred, variations may be made, in addition to those already mentioned, without departing from the principles of the invention.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by

The invention claimed is:

1. A method for controlling feed-speed of a workpiece to a bandsaw, the bandsaw having a sawblade trained around a drive wheel and a driven wheel that is spaced apart from the drive wheel so as to define a spacing between the driven wheel and the drive wheel, and a strain adjustment mechanism for maintaining constant tension in the sawblade by continuously adjusting said spacing to automatically compensate for changes in the length of the sawblade, the method comprising sensing an increase in said spacing as the workpiece is being fed toward the sawblade at a feed-speed, and making a corresponding reduction in the feed-speed.

2. The method of claim 1, wherein said step of sensing senses a displacement of a portion of the strain adjustment mechanism.

3. The method of claim 2, wherein the step of sensing measures said increase.

4. The method of claim 3, wherein the step of sensing includes measuring an increase in said spacing that accumulates over a time sufficient for inferring that the sawblade is accumulating irreversible wear or damage.

5. The method of claim 4, wherein said step of sensing includes measuring a permanent change in the strain of the sawblade by comparing an average of a plurality of measured changes in the strain of the sawblade before a reference time, with an average of a plurality of measured changes in the strain of the sawblade after said reference time.

6. The method of claim 3, wherein said step of sensing includes measuring a permanent change in the strain of the sawblade by comparing an average of a plurality of measured changes in the strain of the sawblade before a reference time, with an average of a plurality of measured changes in the strain of the sawblade after said reference time.

7. The method of claim 2, wherein the step of sensing includes sensing an increase in said spacing that accumulates over a time sufficient for inferring that the sawblade is accumulating irreversible wear or damage.

8. The method of claim 7, wherein said step of sensing includes sensing a permanent change in the strain of the sawblade by comparing an average of a plurality of sensed changes in the strain of the sawblade before a reference time, with an average of a plurality of sensed changes in the strain of the sawblade after said reference time.

9. The method of claim 2, wherein said step of sensing includes sensing a permanent change in the strain of the sawblade by comparing an average of a plurality of sensed changes in the strain of the sawblade before a reference time, with an average of a plurality of sensed changes in the strain of the sawblade after said reference time.

10. The method of claim 1, wherein the step of sensing measures said increase.

11. The method of claim 10, wherein the step of sensing includes measuring an increase in said spacing that accumulates over a time sufficient for inferring that the sawblade is accumulating irreversible wear or damage.

12. The method of claim 11, wherein said step of sensing includes measuring a permanent change in the strain of the sawblade by comparing an average of a plurality of measured changes in the strain of the sawblade before a reference time, with an average of a plurality of measured changes in the strain of the sawblade after said reference time.

13. The method of claim 10, wherein said step of sensing includes measuring a permanent change in the strain of the sawblade by comparing an average of a plurality of measured changes in the strain of the sawblade before a reference time, with an average of a plurality of measured changes in the strain of the sawblade after said reference time.

14. The method of claim 1, wherein the step of sensing includes sensing an increase in said spacing that accumulates over a time sufficient for inferring that the sawblade is accumulating irreversible wear or damage.

15. The method of claim 14, wherein said step of sensing includes sensing a permanent change in the strain of the sawblade by comparing an average of a plurality of sensed changes in the strain of the sawblade before a reference time, with an average of a plurality of sensed changes in the strain of the sawblade after said reference time.

16. The method of claim 1, wherein said step of sensing includes sensing a permanent change in the strain of the sawblade by comparing an average of a plurality of sensed changes in the strain of the sawblade before a reference time, with an average of a plurality of sensed changes in the strain of the sawblade after said reference time.

17. A system for controlling an input device for feeding a workpiece to a bandsaw, the bandsaw having a sawblade trained around a drive wheel and a driven wheel that is spaced apart from the drive wheel so as to define a spacing between the driven wheel and the drive wheel, and a strain adjustment mechanism for maintaining constant tension in the sawblade by continuously adjusting said spacing to automatically compensate for changes in the length of the sawblade, the system comprising:
   a sensor for sensing an increase in said spacing as the sawblade is turning and the workpiece is being fed toward the sawblade at a feed-speed; and
   a controller for controlling the input device to make a corresponding reduction in the feed-speed.

18. The system of claim 17, configured so that said sensor senses a displacement of a portion of the strain adjustment mechanism.

19. The system of claim 18, wherein the sensor is adapted to measure said increase.

20. The system of claim 19, adapted for measuring an increase in said spacing that accumulates over a time sufficient for inferring that the sawblade is accumulating irreversible wear or damage.

21. The system of claim 18, adapted for sensing an increase in said spacing that accumulates over a time sufficient for inferring that the sawblade is accumulating irreversible wear or damage.

22. The system of claim 17, wherein the sensor is adapted to measure said increase.

23. The system of claim 22, adapted for measuring an increase in said spacing that accumulates over a time sufficient for inferring that the sawblade is accumulating irreversible wear or damage.

24. The system of claim 17, adapted for sensing an increase in said spacing that accumulates over a time sufficient for inferring that the sawblade is accumulating irreversible wear or damage.

* * * * *